United States Patent [19]

Seragnoli

[11] 4,033,198

[45] July 5, 1977

[54] DEVICE FOR REDUCING NOISE IN GEAR WHEEL COUPLINGS, WITH A HIGH SAFETY DEGREE

[75] Inventor: Enzo Seragnoli, Bologna, Italy

[73] Assignee: G. D. Societa per Azioni, Italy

[22] Filed: Jan. 29, 1976

[21] Appl. No.: 653,586

[30] Foreign Application Priority Data

Mar. 7, 1975 Italy .................................. 3355/75

[52] U.S. Cl. .................................. 74/443; 74/432
[51] Int. Cl.² .................. F16H 55/14; F16H 55/00
[58] Field of Search ............ 24/432, 433, 443, 461

[56] References Cited

UNITED STATES PATENTS 3,808,906   5/1974   Bowers .............................. 74/443

*Primary Examiner*—Leonard H. Gerin
*Attorney, Agent, or Firm*—Robert E. Burns; Emmanuel J. Lobato; Bruce L. Adams

[57] ABSTRACT

A highly safe device for reducing noise produced in gear wheel couplings in the motion transmission and distribution lines of wrapping and packeting machines operated at very high output speed. Two co-axial and opposite gears have the same number of angularly coincident teeth, one of the gears being formed of rigid metal material and the other consisting of tough and elastically yielding material.

2 Claims, 5 Drawing Figures

DEVICE FOR REDUCING NOISE IN GEAR WHEEL COUPLINGS, WITH A HIGH SAFETY DEGREE

BACKGROUND OF THE INVENTION

The present invention relates to motion-transmitting or drive mechanisms comprising a succession of gear wheels and in particular its subject matter is a device with a high degree of safety for reducing noise produced by the couplings comprising said gear wheels.

In this description, reference will be made to the field of the wrapping and packeting machines in which such problem is particularly acute at the present state of the art.

As known, the conventional machines of the above mentioned type attain output-speed limits (about 500 wrappings per minute) which are practically insuperable in these conventional machines.

The applicant has successfully located one of the main causes of such speed limits in systems for transmitting motion from the source to various members for wrapping products, for feeding products to be wrapped, or for feeding wrapping material.

Said machines of conventional type are in fact widely used for transmitting and distributing the motion of members of flexible nature (belts) or of discontinuous type (chains) or other like members which at high speeds, i.e. beyond well defined limits of mechanical stress are subjected to drawbacks such as, besides breakage, yielding or slackening.

It also appears that such deterioration of the motion transmission and distribution means results in incontrollable deviations from the precise limits assigned to them in the operating phases of the wrapping and feeding members.

In view of the above, the Applicant's Assignees G.D. S.p.A. have abandoned the conventional schemes by excluding from the wrapping and packeting machines the above mentioned types of motion transmission and distribution members, which have been replaced by continuously rotating gear wheel units.

Such gear wheels are arranged in succession and extend from the motion source to the various distribution zones from where the alternating and intermittent motions of the various members involved in the different operating steps are taken.

When bearing in mind, as disclosed for example in U.S. Pat. Nos. 3,670,475 and 3,948,115, that in the wrapping and packeting machines of G.D. S.p.A. the wrapping or packeting operation of the products is performed through greatly simplified operations compared with the machines of conventional type although such simplied operations are more numerous and are carried out along rather long wrapping lines, it should appear that the use of long highly noisy gear wheel trains was thus far unavoidable.

The problem of reducing such noise is particularly acute in the plants where a plurality of such wrapping and manufacturing machines operate, and the numerous attempts to eliminate such inconvenience have given poor results up to now.

Usually, the clients or definite standards in some countries require that the noise level is not higher than 80-85 dB, independently of its frequency, in working surroundings.

Said attempts above all aimed at an accurate forming of the toothings or at various expedients (for instance inclined toothings) and at the use of co-axially meshing and angularly adjustable gear wheels to avoid even minimum play between the gear wheels.

Moreover, the attempts to solve such problem by using gear wheels having different physical characteristics (hardness, elasticity, etc.) in the same motion transmission system, although effective in reducing the noise, are detrimental in case of wear of the gear wheels which are less wear and fatigue resisting.

The need thus exists for the damaged gear wheels to be replaced and for complicated and laborious operations to be preformed in order to restore the coordination of the operating stages of the machine members involved in the various productive operations.

An object of the present invention is then to provide a device capable of reducing to a low level the noise produced by the meshing engagement between motion transmission and distribution gear wheels in said wrapping and packeting machines.

Another object of the present invention, in conformity with the preceding object, is to provide a device of the above mentioned type and with a high degree of safety.

Another object of the present invention is to provide a device of the above mentioned type which is extremely simple and economic in view of the results obtained with it.

SUMMARY OF THE INVENTION

These and still further objects are all attained by a high safety by the new device for reducing the noise generated by the meshing engagement of gear wheels in motion transmission and distribution lines, particularly in very high output speed wrapping and packeting machines, operatively connected to at least one of the gear wheels in said line, said device being characterized in that it comprises two co-axial and opposite gears having the same number of teeth which are angularly coincident, one of the said gears being formed of metal rigid material and the other consisting of tough and resiliently yielding material.

BRIEF DESCRIPTION OF THE DRAWINGS

Further characteristics and advantages will better appear from the following detailed description of a preferred embodiment of the device according to the invention, illustrated only by way of non-limiting example in the accompanying drawings in which.

DESCRIPTION OF THE PREFERRED EMBODIMENT

Figure 1:
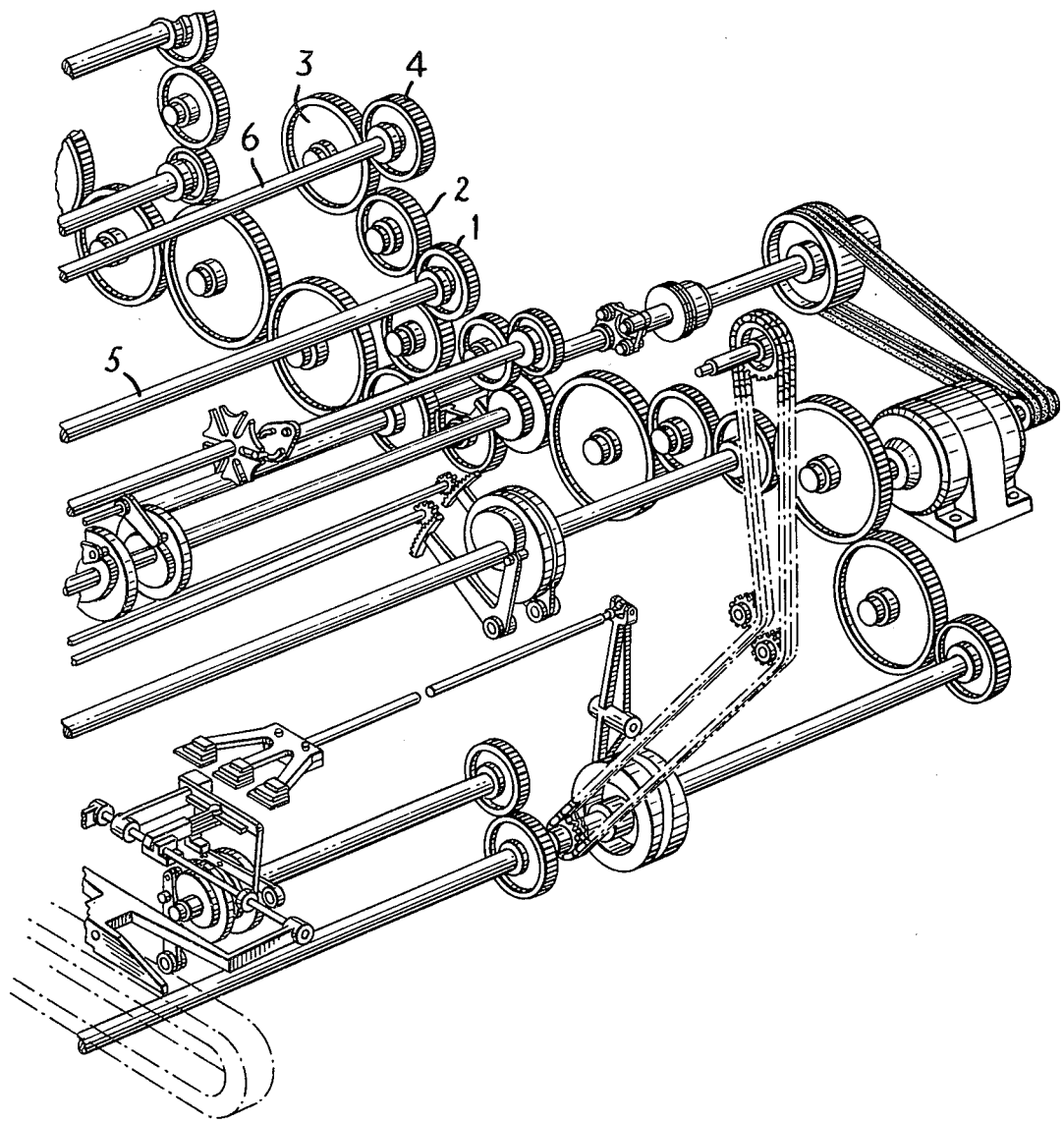
FIG. 1 is a perspective view of a gear wheel unit of the type for which the new device is provided.

With reference to the motion transmission and distribution unit shown in FIG. 1 and of the type disclosed in Pat. No. 3,948,115, as mentioned above, let us consider the train of gear wheels 1, 2, 3, 4 for example. More precisely, the gear wheel 1 is keyed on the shaft 5 and drives the gear 4 keyed on the shaft 6, through two idle gears 2 and 3.

Figure 3:
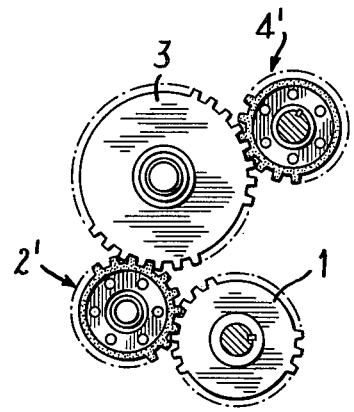
FIG. 3 is a front view, on a somewhat larger scale, of a part of the unit shown in FIG. 1, and showing two devices according to the present invention.

The two gears wheels 2 and 4 have been replaced by the gear wheels 2' and 4', respectively, in FIG. 3, the gear wheels 2' and 4' being produced in accordance with the present invention.

Figure 2:
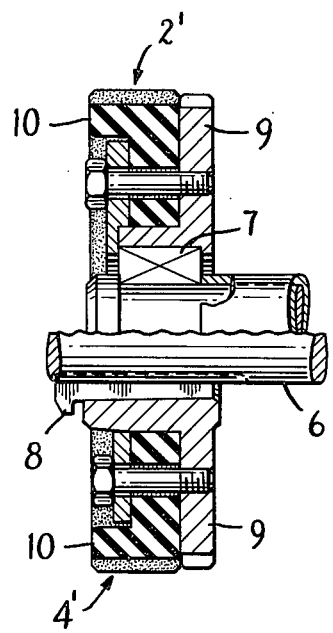
FIG. 2 is a cross-sectional side view of the device according to the present invention, shown on a large scale.

In FIG. 2, the cross-sectional view shown above the axis A illustrates the gear wheel 2' idly rotating through interposition of the bearing 7 on its axis, whereas the gear wheel 4' is shown as located below the axis A and keyed on the shaft 6 by means of the key 8.

The gear wheels 2' and 4' comprise each a standard metal gear 9 to which a second gear 10 is fixed, the gear 10 having the coaxially and contiguously therewith as shown, same number of teeth as the gear 9 and being formed of tough and elastically yielding material (rubber, nylon, etc.).

Figure 4:
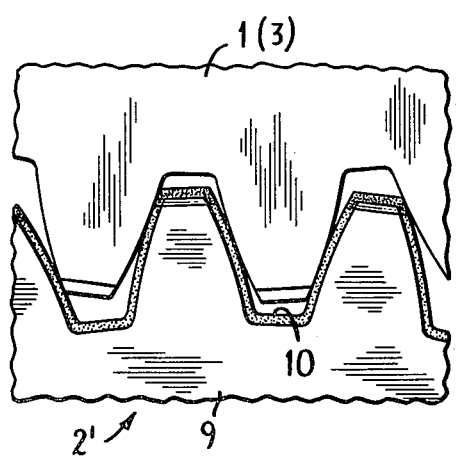
FIGS. 4 and 5 are a front view and a cross-sectional side view respectively of detail of FIG. 3 on a larger scale.
Figure 5:
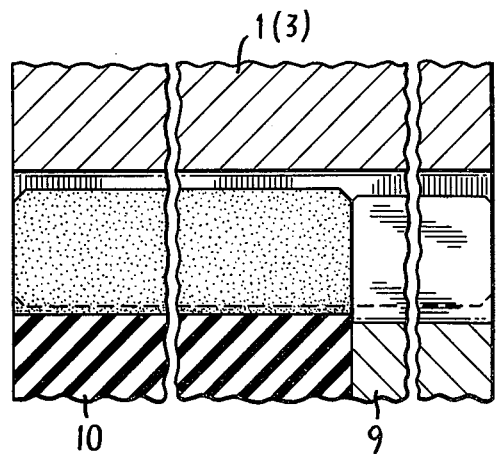

As clearly shown in FIG. 2 and particularly in FIGS. 4 and 5, the toothed contours of the gears 10 are angularly coincident by slightly enlarged with respect to those of the gears 9 that the metal teeth of the adjacent gear wheels 1 and 3 are meshing only with the teeth of said gears 10.

In case of wear of the gears 10 and before their replacement, the continuity of the motion transmission and distribution mechanism is ensured and phase displacement are prevented by the pressure of the metal gears 9.

The above device, besides being a very effective means for reducing noise, particularly when it is used to replace standard metal gear wheels rotating at very high speed, contrary to other systems of known type, is fully safe or reliable.

I claim:

1. A device for safely reducing noise produced in gear wheel couplings in motion transmission and distribution lines, particularly of wrapping and packeting machines operating at very high output speed, operatively connected to a gear wheel in such a line, comprising two gears coaxial and contiguous with one another and having identical numbers and angularly coincident arrangements of teeth, one of the gears consisting of rigid metal material and the other consisting of tough and elastically yielding material.

2. A device as claimed in claim 1, characterized in that said other gear of tough and elastically yielding material has a contour larger than the contour of the gear of rigid metal so that motion transmission is performed only by the other gear.

* * * * *